United States Patent Office 3,274,155
Patented Sept. 20, 1966

3,274,155
ORGANOSILICON COMPOSITIONS
Frederick C. Saunders, Llandough, Cowbridge, Glamorgan, and Derek S. Caldwell, Penarth, Glamorgan, Wales, assignors to Midland Silicones Limited, London, England
No Drawing. Filed Aug. 5, 1964, Ser. No. 387,767
Claims priority, application Great Britain, Sept. 8, 1963, 31,526/63
11 Claims. (Cl. 260—46.5)

This invention relates to novel compositions prepared by the reaction of organosilicon compounds with pyromellitic dianhydride.

The object of the present invention is to prepare a copolymer which will exhibit good thermal stability. Another object is to provide a siloxane copolymer having imide linkages. Other objects and advantages of this invention are detailed in or will be apparent from the disclosure and claims following.

The present invention provides a novel composition of matter which is the product formed by reacting
(A) pyromellitic dianhydride with
(B) an amino organosiloxane having at least two units selected from the group consisting of $R_2SiO$, $RSiO_{1.5}$ and $R_3SiO_{0.5}$, wherein each R is a monovalent organic radical selected from the group consisting of hydrocarbon radicals, halogenated hydrocarbon radicals, cyanoalkyl radicals, alkoxy radicals and amino hydrocarbon radicals of the formula —Z—$NH_2$ wherein Z is a divalent organic radical bonding the amino group to a silicon atom through a silicon-carbon bond, said siloxane having at least two monovalent organic radicals per molecule which are amino organic radicals.

The amino organo siloxanes can be any siloxane which contains an average of at least two organic radicals per molecule each having at least one primary amino group per radical attached to a silicon atom through a silicon-carbon bond. The siloxanes contain at least two siloxane units which can be $R_2SiO$, $RSiO_{1.5}$ or $R_3SiO_{0.5}$ where R is a monovalent organic radical. The operative siloxanes contain per molecule an average of at least two radicals of the formula —Z—$NH_2$ wherein Z is a divalent organic radical bonding the amino group to a silicon atom through a silicon-carbon bond. Examples of Z are divalent radicals such as methylene, ethylene, propylene, butylene, amylene, —CH=CH—, —$CH_2CH_2NHCH_2$—, —$CH_2CH_2CH_2\overset{CH_3}{\underset{|}{N}}$—$CH_2CH_2$—
—$CH_2CH_2$—O—$CH_2CH_2CH_2$—, —$CH_2(CH_2)_{16}CH_2$—
—$CH_2CH_2SCH_2CH_2$—, —$CH_2CH_2CF_2CH_2$—
—$CH_2CH_2\overset{Cl}{\underset{|}{C}}HCH_2$—, phenylene, —$CH_2C_6H_4$—, —$CH_2C_6H_3Cl$—

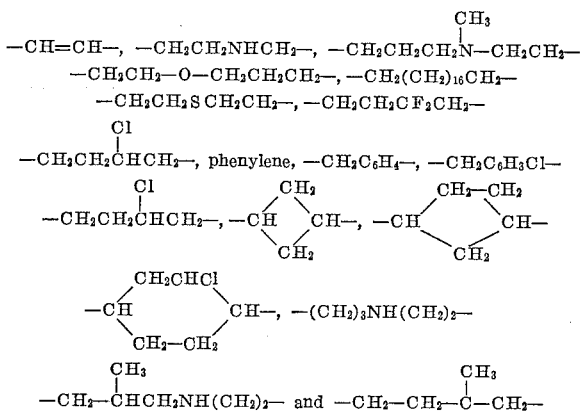

Z can contain elements other than hydrogen and carbon, such as oxygen, nitrogen, hlaogen atoms and sulfur as long as the Z radical is bonded to the silicon atom through a silicon-carbon bond. Preferably, Z is methylene, propylene, butylene, polymethylene or phenylene.

Provided the amino organosiloxane contains an average of at least two silicon-bonded primary amino-substituted organic radicals per molecule the nature of the remaining organic radicals attached to the silicon atom is not critical. Any organic radicals present in addition to the required amino-organic radicals should be non-reactive with the pyromellitic dianhydride. Therefore, R can be alkyl radicals such as methyl, ethyl, propyl, butyl and octadecyl radicals, alkenyl radicals such as vinyl and allyl radicals, aryl radicals such as phenyl, naphthyl, xenyl, tolyl and xylyl radicals, cycloalkyl radicals such as cyclopentyl and cyclohexyl radicals, cycloalkenyl radicals such as cyclopentenyl and cyclohexenyl radicals, halogenated hydrocarbon radicals such as chloromethyl, chloropropyl, 3,3,3-trifluoropropyl, dichlorophenyl and dibromophenyl radicals, cyanoalkyl radicals such as

—$CH_2CN$, —$CH_2CH_2CN$, —$CH_2CH_2CH_2CN$

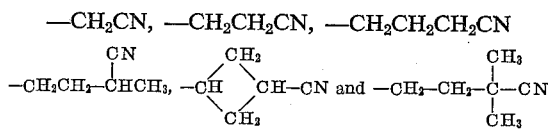

radicals and alkoxy radicals such as methoxy, ethoxy, isopropoxy, propoxy, butoxy and hexoxy radicals. The preferred monovalent organic radicals, in addition to the amino-organic radicals, are methyl, ethyl, propyl, octadecyl, vinyl, allyl, phenyl and naphthyl radicals.

The amino-organosiloxane can be any branched or resinous organopolysiloxane of the general unit formula

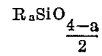

where R is defined above, preferably R is methyl, ethyl, propyl, vinyl or phenyl radicals, and $a$ has an average value from 1 to less than 2. These organopolysiloxanes can contain any desired combination of $RSiO_{1.5}$, $R_2SiO$ and/or $R_3SiO_{0.5}$ units so long as the average ratio of R/Si is in the range from 1.0/1 to less than 2.0/1. These organopolysiloxanes containing units of

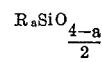

must contain an average of at least two amino-organic radicals per molecule. The above siloxanes can be homopolymers, copolymers or mixtures of homopolymers and/or copolymers.

The preferred amino organosiloxanes are the organopolysiloxanes which are linear or substantially linear siloxane polymers consisting essentially of repeating units of the general formula ($R_2SiO$) wherein R is defined above. These linear organopolysiloxanes can range from disiloxanes to high molecular weight polymers having 200 or more units of the formula $R_2SiO$. The siloxane can be endblocked with siloxane units of the formula $R_3SiO_{0.5}$. The required two or more amino-organic radicals, can be at any location on the siloxane chain. A preferred linear siloxane copolymer is a siloxane having the general structure $R'_3SiO[R''_2SiO]_nSiR'_3$ wherein each R' is a monovalent organic radical selected from the group consisting of hydrocarbon radicals, halogenated hydrocarbon radicals and cyanoalkyl radicals, R'' is a monovalent organic radical selected from the group consisting of hydrocarbon radicals, halogenated hydrocarbon radicals, cyanoalkyl radicals and amino organic radicals of the formula —Z—$NH_2$ wherein Z is a divalent organic radical bonding the amino group to a silicon atom through a silicon-carbon bond, $n$ has an average value of at least 1, and an average of at least two R'' radicals per molecule being amino organic radicals. These linear siloxane polymers can have amino organic radicals any place on the siloxane chain except on the terminal silicon atoms. The number of units of ($R''_2SiO$) can vary widely such that $n$ can have an average value from 1 to 200 or more.

The most preferred of the operative amino-organo siloxanes are the linear siloxane copolymers having a minor proportion of siloxane units containing the silicon-bonded amino organic radicals with a major proportion of siloxane units in which the radicals are monovalent organic radicals other than amino organic radicals. For example, the siloxane polymer can be a polymer such as described above by the general structure such as a dimethylpolysiloxane containing a few mol percent of copolymerized methyl(gamma-aminopropyl)siloxane and endblocked with trimethylsilyl units. The reaction product of this polysiloxane with pyromellitic dianhydride cannot be readily defined structurally. The nature of the material resulting from the cross-linking of the siloxane polymer with the pyromellitic dianhydride depends upon the number of amino organic radicals per molecule present. Thus, siloxanes containing higher numbers of amino-organic radicals per molecule will be more resinous.

In order that a regular and well defined structure be formed the amino-organosiloxane should have a general structure

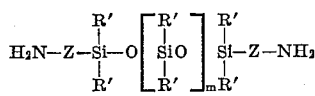

wherein each R' and Z are as defined above and $m$ has an average value from 0 to 200 inclusive. The length of the chain can be such that the value of $m$ ranges from 0 to 200 or more. A regular structure can be formed by reacting pyromellitic dianhydride with a siloxane as described above such as a polydimethylsiloxane endblocked with dimethyl(gamma-propyl)siloxane units. The reaction product will be a copolymer containing a repeating unit of the following type

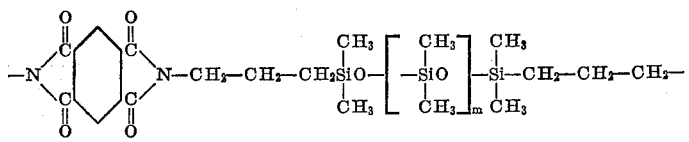

The reaction products of pyromellitic dianhydride with amino-organosiloxanes form various copolymers depending upon the nature of the siloxane reactant. The linkages formed between the pyromellitic dianhydride and the amino group of the siloxane polymer is for the most part an imide linkage

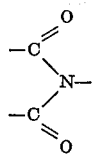

Other linkages which can also result are not excluded from this invention.

The amino-organosiloxanes are preferably siloxanes which contain at least two gamma-amino propyl or delta-amino butyl radicals per molecule with the remaining organic groups attached to the silicon atoms being methyl. The average length of the polysiloxane chains range from 2 to 200 silicon atoms, with optimum results from 2 to 100 silicon atoms per molecule.

The amount of pyromellitic dianhydride reacted with the amino-organosiloxane is preferably 0.5 mol of pyromellitic dianhydride for each mol of primary amino group. The amount of pyromellitic dianhydride can range from a very small amount to an excess but preferably there is from 0.25 to 0.5 mol of pyromellitic dianhydride per mol of primary amino group.

The preparation of the above imide containing siloxane copolymers can be carried out by heating a mixture of pyromellitic dianhydride and the amino organosiloxane. Preferably, the two reactants are brought together and initially reacted in the presence of an inert mutual organic solvent. Inert mutual organic solvents can be any solvent which will solubilize the reactants and which is non-reactive with the reactants. Such solvents are N,N-dimethyl formamide; N,N-dimethylacetamide; N,N-diethylformamide; N,N-diethylacetamide; N,N-dimethylmethoxyacetamide; dimethylsulfoxide; N-methyl-2-pyrrolidone; pyridine, dimethylsulfone, hexamethylphosphoramide; tetramethylene sulfone and dimethyltetramethylene sulfone. These solvents are satisfactory but advantages are also found in using mixtures of the above solvents with other inert organic solvents such as benzene, benzonitrile, dioxane, beta-ethoxyethylacetate, butyrolacetone, xylene, toluene and cyclohexane.

The temperature at which the initial reaction is conducted is not critical and can be, for example, room temperature, preferably it is below 50° C.

After the initial reaction is complete, the solvent is removed. The solvent can be removed by vacuum, but it is preferred to use heating. The temperature is increased above 140° C., preferably above 150° C., to aid in removing the water formed during reaction and to cause further polymerization of the reaction product. The temperature is preferably increased after the solvent has been removed to 200°–300° C. and maintained for one hour or more. The best results are obtained when the temperature is maintained after the solvent has been removed between 200° C. and 25° C. for from 1 to 5 hours.

Depending upon the nature of the amino-organosiloxane employed in their preparation, the compositions of this invention vary from viscous liquids to hard brittle solids. Those compositions containing a high proportion of the siloxane will be soluble in a wide variety of the known siloxane solvents, such as toluene, xylene and benzene. However, as the proportion of the pyromellitic dianhydride is increased the reaction products become characterized by their lack of solubility in these solvents.

The compositions of this invention exhibit good thermal stability and are useful as coatings for metals, for example as wire coatings, and as adhesives. The compositions of this invention can also be drawn into fibers.

The following examples are illustrative only and should not be construed as limiting the invention which is properly delineated in the appended claims.

*Example 1*

7.3 g. (0.033 mole) of pyromellitic dianhydride which had been purified by vacuum sublimation was dissolved in 50 ml. of dimethyl formamide. The resulting solution was then added with stirring to a solution of 8.3 g. of 1,3-dimethyl (γ-aminopropyl)disiloxane

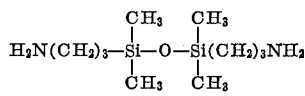

in 50 ml. of dimethyl formamide, the reactants being maintained under cover of an inert gas and the reaction vessel temperature being held below 50° C. The mixture of reactants was then heated to a temperature of about 150° C. to remove the solvent. When distillation of the solvent was almost complete the temperature of the mixture rose quickly to 300° C. and then fell slowly to 230° C. More heat was applied and the reactants maintained at 230° C. for about 3½ hours. At the end of this period the system was evacuated and the contents of the reaction vessel held at 220° C. under a pressure of 1 mm. Hg for one hour.

On cooling a dark brown, brittle solid remained which could be drawn into fibers at a temperature of about 150–160° C.

On analysis the reaction product was found to contain 6.25% by weight of nitrogen and 13.14% by weight of silicon. The theoretical values for a polymer comprising the repeating unit

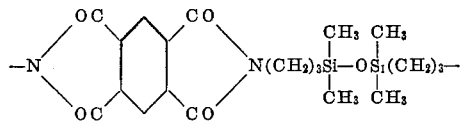

are 6.51% by weight of nitrogen and 13.02% by weight of silicon.

Weight loss determinations were carried out on the reaction product which was found to have suffered a loss of 0.74% by weight after being heated for 32 hours at 150° C. and 3.05% by weight after 37½ hours at 250° C.

*Example 2*

A solution of 0.66 g. (0.003 mole) of pyromellitic dianhydride in 30 ml. of dimethyl formamide was added under a blanket of inert gas to an organopolysiloxane liquid having a molecular weight of 3280 and comprising a dimethylsiloxane polymer having an average chain length of 41 dimethylsiloxane units and end-blocked with dimethyl(γ-aminopropyl)siloxy units. After removal of the solvent by distillation at about 150° C. the reaction mixture was heated to a temperature of 220°–230° C. for 4 hours. At the end of this period a vacuum was applied to the system and the reaction vessel maintained at a pressure of 0.5 mm. Hg for 30 minutes.

On cooling, the reaction product was found to be a straw coloured liquid polymer of high viscosity. Further heating of the polymer caused an increase in the viscosity of the liquid.

Analysis of the product showed 36.65% by weight of silicon and 0.85% by weight of nitrogen. Theoretical values for a polymer comprising the repeating unit

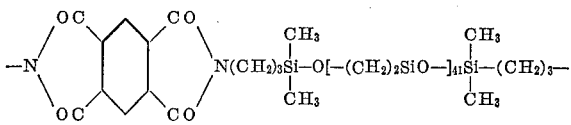

are 34.68% by weight of silicon and 0.81% by weight of nitrogen.

*Example 3*

The process of Example 2 was employed to react pyromellitic dianhydride with an organopolysiloxane comprising a dimethylpolysiloxane having an average chain length of 100 dimethylsiloxane units and end-blocked with dimethyl(γ-aminopropyl)siloxy units.

The reaction product was a high viscosity liquid polymer containing 0.5% by weight of nitrogen and 35.1% by weight of silicon.

*Example 4*

When any of the following amino-organosiloxanes replace the dimethyl(γ-aminopropyl) endblocked dimethylpolysiloxane of Example 2 and the same procedure is followed, copolymers containing imide linkages are formed.

(A)
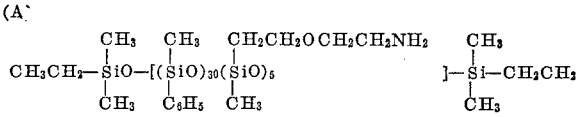

(B)
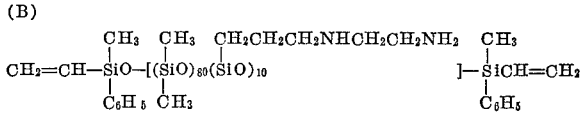

(C)
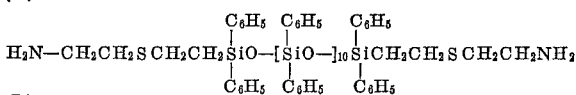

(D)
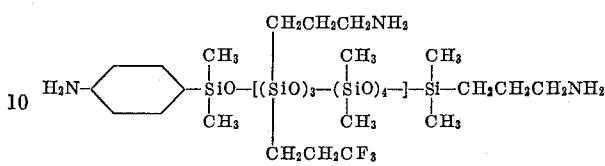

(E) a copolymer composed 60 mol per cent (C₆H₅)SiO₁.₅
30 mol per cent (CH₃)₂SiO and 10 mol per cent

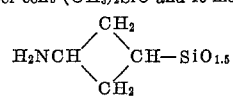

(F)
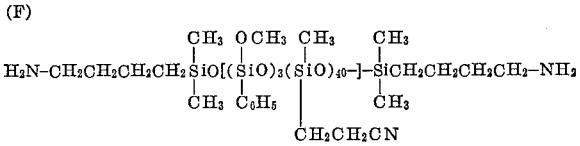

(G)
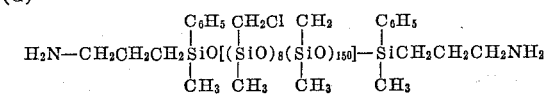

(H)
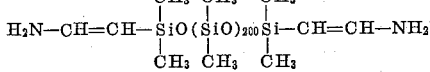

*Example 5*

When any of the following solvents are used in preparing imide containing siloxane copolymer in Example 4 equivalent results are obtained.

(A) dimethylsulfoxide
(B) N-methyl-2-pyrrolidone
(C) N,N-dimethylacetamide
(D) 60 weight percent N,N-dimethylformamide
    40 weight percent toluene
(E) 55 weight percent dimethylsulfone
    45 weight percent dioxane.

That which is claimed is:

1. A composition of matter consisting essentially of the product formed by reacting
   (A) pyromellitic dianhydride with
   (B) an amino-organosiloxane having at least two units selected from the group consisting of $R_2SiO$, $RSiO_{1.5}$ and $R_3SiO_{0.5}$ wherein each R is a monovalent organic radical selected from the group consisting of hydrocarbon radicals, halogenated hydrocarbon radicals, cyanoalkyl radicals, alkoxy radicals and amino organic radicals of the formula —Z—NH₂ wherein Z is a divalent organic radical containing atoms selected from the group consisting of carbon atoms, hydrogen atoms, oxygen atoms, nitrogen atoms, halogen atoms and sulfur atoms and bonding the amino group to a silicon atom through a silicon-carbon bond, said siloxane having at least two monovalent organic radicals per molecule which are amino organic radicals.

2. A composition of matter in accordance with claim 1 wherein Z is an n-propylene radical.

3. A composition of matter in accordance with claim 1 wherein Z is an n-butylene radical.

4. A composition of matter consisting essentially of the product formed by reacting
   (A) pyromellitic dianhydride with
   (B) an amino-organosiloxane having the general structure $R'_3SiO[R''_2SiO]_nSiR'_3$ wherein each R' is a monovalent organic radical selected from the group consisting of hydrocarbon radicals, halogenated hydrocarbon radicals and cyanoalkyl radicals, R" is a monovalent organic radical selected from the group consisting of hydrocarbon radicals, halogenated hydrocarbon radicals, cyanoalkyl radicals and amino organic radicals of the formula Z—NH₂ wherein Z is a divalent organic radical containing atoms selected from the group consisting of carbon atoms, hydrogen atoms, oxygen atoms, nitrogen atoms, halogen atoms and sulfur atoms and bonding the amino group to a silicon atom through a silicon-carbon bond, $n$ has an average value of at least 1, and an average of at least two R" radicals per molecule being amino organic radicals.

5. A composition of matter in accordance with claim 4 wherein Z is a n-propylene radical and R' is a methyl radical.

6. A composition of matter consisting essentially of the product formed by reacting
(A) pyromellitic dianhydride with
(B) an amino-organosiloxane having the general structure

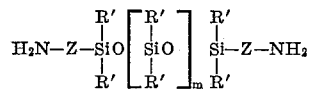

wherein each R' is a monovalent organic radical selected from the group consisting of hydrocarbon radicals, halogenated hydrocarbon radicals and cyanoalkyl radicals, Z is a divalent organic radical containing atoms selected from the group consisting of carbon atoms, hydrogen atoms, oxygen atoms, nitrogen atoms, halogen atoms and sulfur atoms, and bonded to a silicon atom through a silicon-carbon bond and $m$ is an integer including zero.

7. A composition of matter in accordance with claim 6 wherein Z is a propylene radical, R' is a methyl radical and $m$ is zero.

8. A composition of matter in accordance with claim 6 wherein $m$ has an average value from 0 to 100, Z is a propylene radical and R' is a methyl radical.

9. A process for the preparation of a siloxane copolymer containing imide linkages comprising
(1) reacting in an inert mutual organic solvent
(A) pyromellitic dianhydride with
(B) an amino-organosiloxane having at least two units selected from the group consisting of $R_2SiO$, $RSiO_{1.5}$ and $R_3SiO_{0.5}$ wherein each R is a monovalent organic radical selected from the group consisting of hydrocarbon radicals, halogenated hydrocarbon radicals, cyanoalkyl radicals, alkoxy radicals and amino-organic radicals of the formula —Z—NH₂ wherein Z is a divalent organic radical containing atoms selected from the group consisting of carbon atoms, hydrogen atoms, oxygen atoms, nitrogen atoms, halogen atoms and sulfur atoms and bonding the amino group to a silicon atom through a silicon-carbon bond, said siloxane having at least two monovalent organic radicals per molecule which are amino-organic radicals, thereafter
(2) removing the solvent from the reaction mixture by increasing the temperature above 140° C.

10. The process of claim 9 further characterized in that after the solvent removal the reaction product is maintained at a temperature above 200° C. for at least one hour.

11. The process of claim 10 in which the solvent is dimethylformamide.

References Cited by the Examiner
UNITED STATES PATENTS

| | | | |
|---|---|---|---|
| 3,179,630 | 4/1965 | Endrey | 260—78 |
| 3,179,631 | 4/1965 | Endrey | 260—78 |
| 3,179,634 | 4/1965 | Edwards | 260—78 |

LEON J. BERCOVITZ, *Primary Examiner.*

F. McKELVEY, *Assistant Examiner.*

UNITED STATES PATENT OFFICE
CERTIFICATE OF CORRECTION

Patent No. 3,274,155　　　　　　　　　　　　September 20, 1966

Frederick C. Saunders et al.

It is hereby certified that error appears in the above numbered patent requiring correction and that the said Letters Patent should read as corrected below.

Column 1, line 56, for "$-CH_2CH_2\overset{Cl}{\underset{|}{C}}HCH_2-$" read -- $-CH_2CH_2\overset{CN}{\underset{|}{C}}HCH_2-$ --; column 4, line 27, for "25° C." read -- 250° C. --; column 5, lines 41 to 44, for that portion of the formula reading:

$$[-(CH_2)_2SiO-] \quad\quad \text{read} \quad\quad [-(CH_3)_2SiO-]$$

same column 5, lines 66 to 70, for that portion of the formula reading:

$$\underset{\underset{CH_3}{|}}{\overset{\overset{CH_3}{|}}{-Si}}-CH_2CH_2 \quad\quad \text{read} \quad\quad \underset{\underset{CH_3}{|}}{\overset{\overset{CH_3}{|}}{-Si}}-CH_2CH_3$$

Signed and sealed this 26th day of September 1967.

(SEAL)
Attest:

ERNEST W. SWIDER　　　　　　　　　　EDWARD J. BRENNER
Attesting Officer　　　　　　　　　　Commissioner of Patents